United States Patent
Olds

(10) Patent No.: US 11,783,733 B2
(45) Date of Patent: Oct. 10, 2023

(54) COURTESY FLAG

(71) Applicant: Kim Olds, Porter Ranch, CA (US)

(72) Inventor: Kim Olds, Porter Ranch, CA (US)

(*) Notice: Subject to any disclaimer, the term of this patent is extended or adjusted under 35 U.S.C. 154(b) by 423 days.

(21) Appl. No.: 16/801,300

(22) Filed: Feb. 26, 2020

(65) Prior Publication Data

US 2020/0312201 A1 Oct. 1, 2020

Related U.S. Application Data

(60) Provisional application No. 62/824,496, filed on Mar. 27, 2019.

(51) Int. Cl.
| | | |
|---|---|---|
| *G09F 7/22* | (2006.01) | |
| *B60R 11/00* | (2006.01) | |
| *B60Q 1/50* | (2006.01) | |
| *G09F 7/18* | (2006.01) | |

(52) U.S. Cl.
CPC .............. *G09F 7/22* (2013.01); *B60Q 1/503* (2013.01); *B60Q 1/544* (2022.05); *B60R 11/00* (2013.01); *B60R 2011/004* (2013.01); *G09F 2007/1878* (2013.01)

(58) Field of Classification Search
CPC ..... G09F 7/22; G09F 2007/1878; B60Q 1/50; B60R 11/00; B60R 2011/004
USPC .......... 116/28 R, 35 R, 51, 52; 40/218, 643, 40/644, 649, 591, 593, 606.07, 911; 248/278.1, 282.1, 285.1, 279.1, 281.11, 248/283.1, 287.1; 211/119.06
See application file for complete search history.

(56) References Cited

U.S. PATENT DOCUMENTS

| | | | | |
|---|---|---|---|---|
| 866,658 | A * | 9/1907 | Johnsen ................ | B60R 1/081 359/855 |
| 1,162,608 | A * | 11/1915 | Hohl et al. ............ | A01K 97/10 248/514 |
| 1,682,180 | A * | 8/1928 | Merrill ................ | A47B 23/025 248/447.2 |
| 2,419,923 | A * | 4/1947 | Tolbert ................ | B60R 1/0605 248/278.1 |
| 2,458,117 | A * | 1/1949 | Tolbert ................ | B60R 1/0605 248/213.1 |
| 2,467,294 | A * | 4/1949 | Cochran ............... | B60J 3/026 248/278.1 |
| 2,526,306 | A * | 10/1950 | Gelder ................. | B60R 1/078 248/480 |
| 2,546,855 | A * | 3/1951 | Frame ................. | B60R 13/00 248/539 |
| 2,552,074 | A * | 5/1951 | Thompson ............ | B60R 1/078 248/213.1 |

(Continued)

*Primary Examiner* — Christopher Garft
*Assistant Examiner* — Michael McDuffie
(74) *Attorney, Agent, or Firm* — Brennan, Manna & Diamond, LLC

(57) ABSTRACT

A signaling device for defining a space between parked vehicles. The signaling device comprises a vehicle attachment component, an extendable component, and a warning component. The vehicle attachment component is configured to engage a vehicle window. The extendable component comprises rotatable and telescoping arms for defining the space between the vehicles when the rotatable and telescoping arms are extended. The warning component alerts others of the defined space. A method of using the signaling device to define a space between parked vehicles is also disclosed.

9 Claims, 6 Drawing Sheets

(56) References Cited

U.S. PATENT DOCUMENTS

| | | | | |
|---|---|---|---|---|
| 2,657,107 A * | 10/1953 | Bisaga | B60N 3/002 108/45 |
| 2,681,200 A * | 6/1954 | Bisson | A24F 19/0092 131/241 |
| 2,720,718 A * | 10/1955 | Vaniman | G09B 29/00 40/603 |
| 2,751,817 A * | 6/1956 | Lapekas | B60R 1/0605 D12/187 |
| 2,927,310 A * | 3/1960 | Knapp | B60D 1/36 200/61.42 |
| 3,060,605 A * | 10/1962 | Flack | G09F 7/18 40/591 |
| 3,136,289 A * | 6/1964 | Johnson | G09F 17/00 248/231.71 |
| 3,540,406 A * | 11/1970 | Dexter | B60R 13/00 116/28 R |
| 3,742,209 A * | 6/1973 | Williams | F21V 21/26 248/629 |
| 3,788,268 A * | 1/1974 | Hiatt | E01F 9/662 116/63 P |
| 4,375,134 A * | 3/1983 | Sheetz | G09F 7/00 40/591 |
| 4,458,870 A * | 7/1984 | Duncan | A61G 5/10 248/279.1 |
| 4,562,987 A * | 1/1986 | Leeds | F16M 11/2014 248/920 |
| 4,565,152 A * | 1/1986 | Bennett | G09F 17/00 116/303 |
| 4,583,310 A * | 4/1986 | Seiler | G09F 21/04 116/28 R |
| 4,856,741 A * | 8/1989 | Schaefer | A61G 13/10 5/601 |
| 5,048,451 A * | 9/1991 | Reimers | B60Q 1/486 116/35 R |
| 5,279,488 A * | 1/1994 | Fleming | B60N 3/00 248/452 |
| 5,431,364 A * | 7/1995 | Etter | A45B 11/00 248/514 |
| 5,540,181 A * | 7/1996 | Pearce | G09F 17/00 73/170.15 |
| 5,609,321 A * | 3/1997 | McClellan | B60R 7/12 248/291.1 |
| 5,975,009 A * | 11/1999 | Nihra | G09F 17/00 40/607.04 |
| 6,057,787 A * | 5/2000 | Kell | B63B 49/00 340/984 |
| 6,213,047 B1 * | 4/2001 | Means | B60Q 1/50 116/28 R |
| 6,478,272 B1 * | 11/2002 | McKinsey | F16M 11/08 248/217.4 |
| 6,962,126 B1 * | 11/2005 | Payson | B63B 15/00 116/303 |
| 7,637,226 B1 * | 12/2009 | Bradley | G09F 15/0062 40/607.1 |
| 7,878,139 B1 * | 2/2011 | Karnes | G09F 17/00 116/28 R |
| 7,959,120 B2 * | 6/2011 | Liao | B60R 11/0252 248/292.12 |
| 8,430,052 B2 * | 4/2013 | Nihra | G09F 21/04 116/28 R |
| 8,485,207 B1 * | 7/2013 | Boyington | E04H 15/06 280/505 |
| 8,613,258 B1 * | 12/2013 | Barry, IV | G09F 17/00 116/28 R |
| 9,500,348 B2 * | 11/2016 | Callister | F21V 21/088 |
| 10,099,542 B2 * | 10/2018 | Teague | A45B 11/00 |
| 2007/0283875 A1 * | 12/2007 | Durkin | G09F 21/04 116/173 |
| 2022/0289105 A1 * | 9/2022 | Bartolucci | B60Q 1/32 |

* cited by examiner

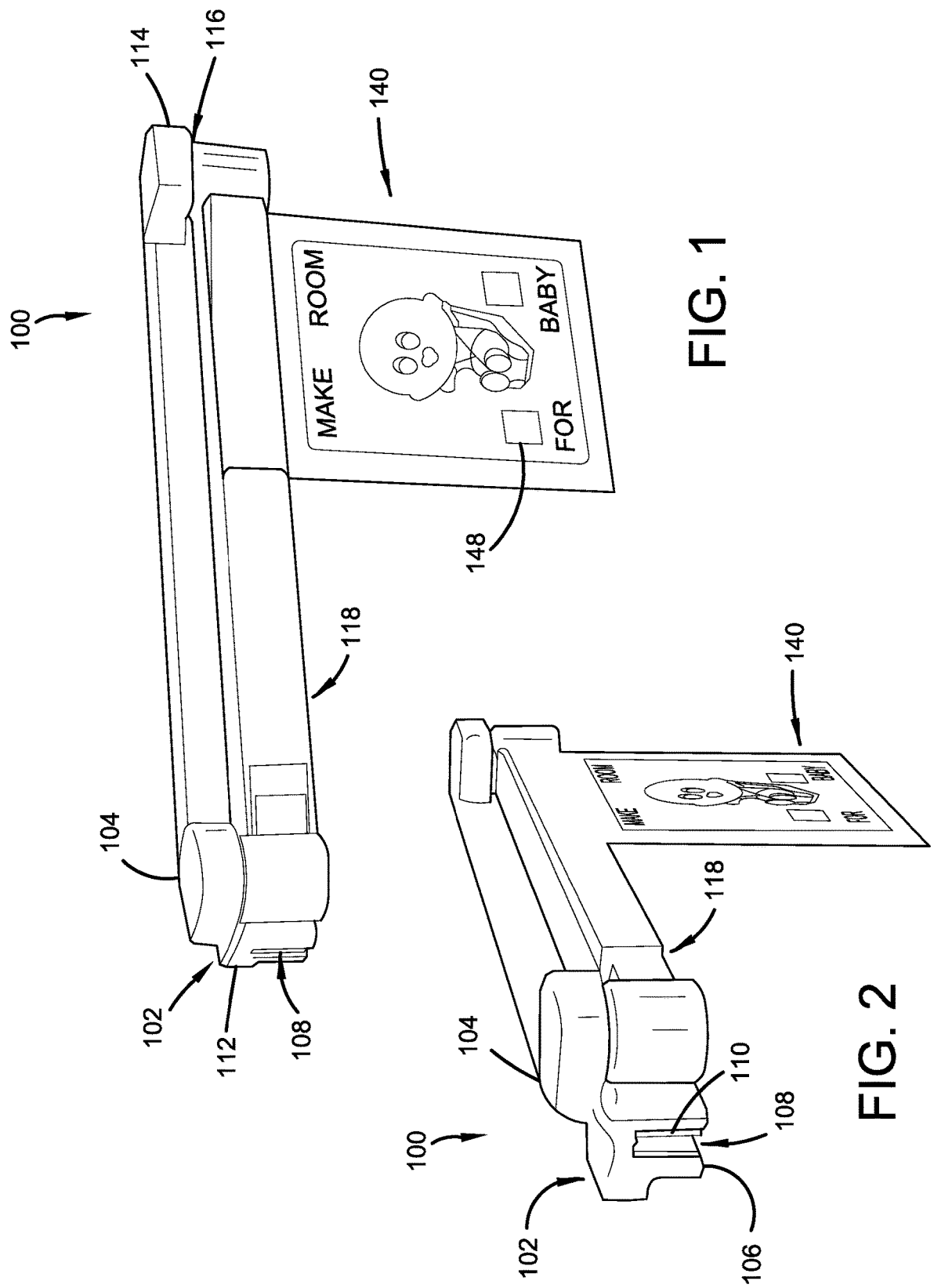

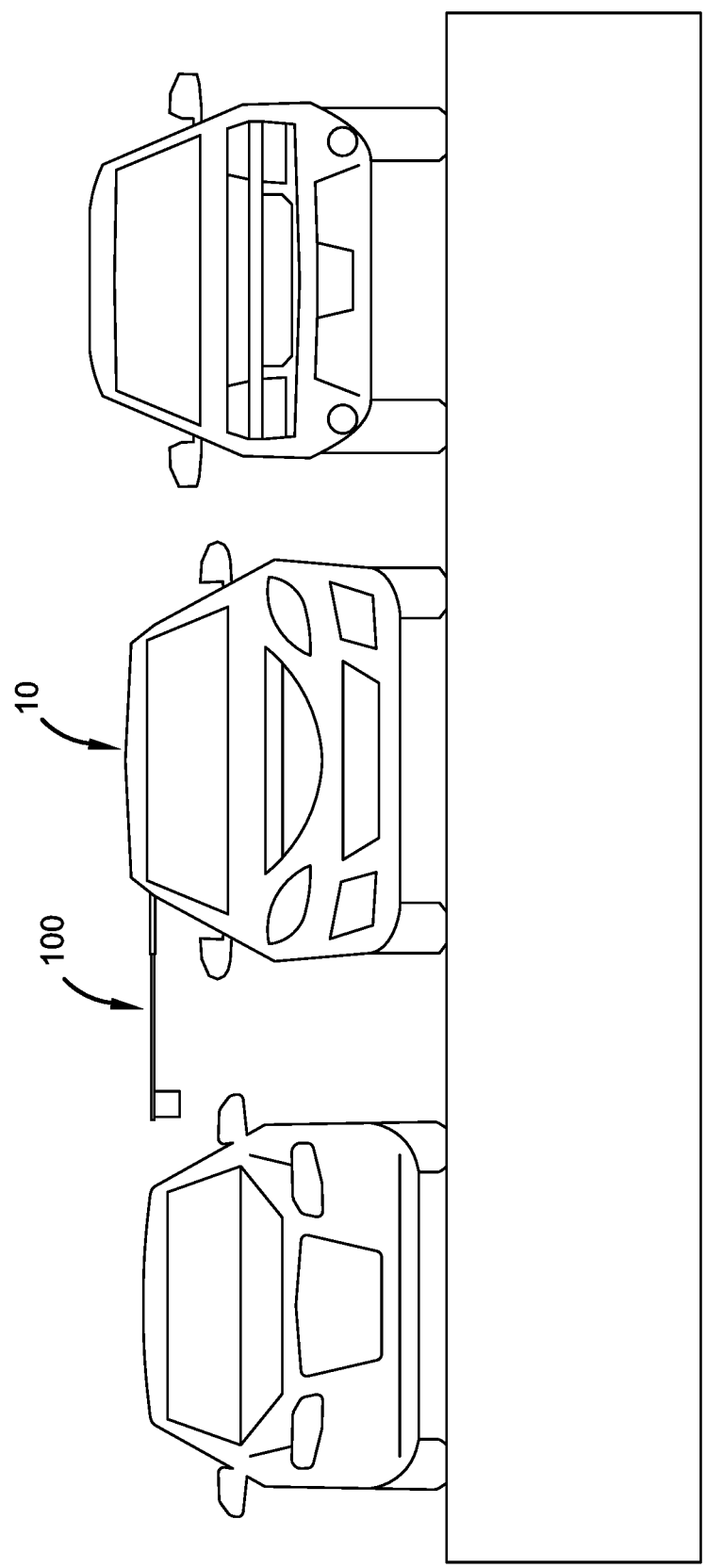

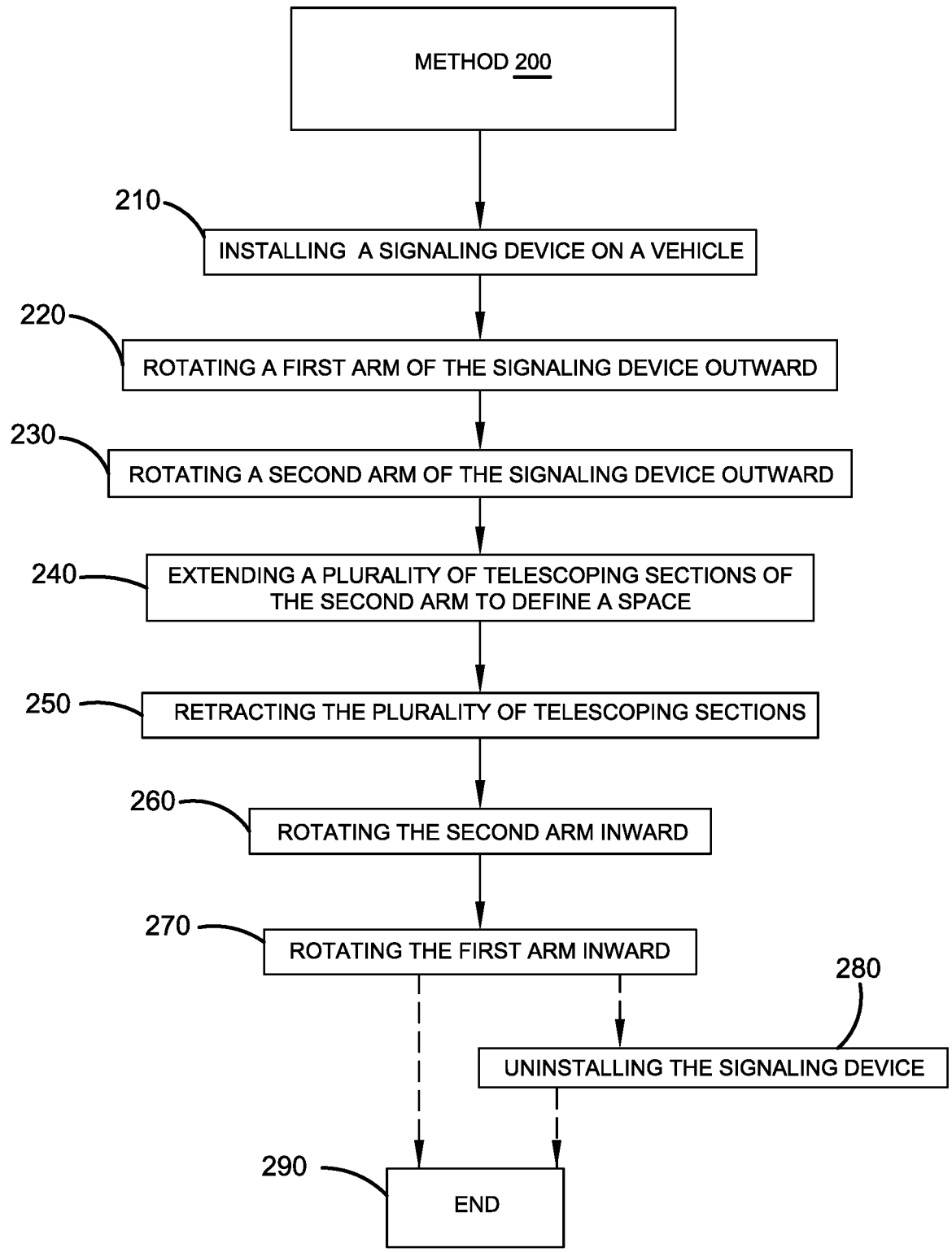

COURTESY FLAG

CROSS-REFERENCE

This application claims priority from Provisional Patent Application Ser. No. 62/824,496 filed on Mar. 27, 2019.

BACKGROUND

Parking spaces in general are getting smaller and smaller with the increase in the number of vehicles existing today. Urban parking areas and parking garages especially often have barely enough room for even the average car. People with larger cars, SUV's, or trucks are often forced to squeeze into and out of the tight spaces between parked vehicles, or just completely abandon the tight parking spaces altogether. This is exacerbated further when children in child seats are in the vehicles. Similarly, larger, older, or less flexible individuals also have difficulty navigating these tight spaces between parked vehicles.

There is solution for handicap parking if an individual is disabled enough to receive a handicap parking designation. These handicap parking spaces are much wider on average and are protected from incursion by large civil fines. Even so, there is often little enforcement of violators leaving the handicapped individuals to vie for regular parking spaces where there is insufficient room to exit or enter the vehicle. Vehicles with wheelchair ramps that extend from the sides can still not have enough room in every circumstance even in the handicap designated spaces.

While there are at least some solutions for handicap vehicle parking, mothers of young children requiring child and infant car seats have no such protection. Many states' passenger safety laws require that children under the age of four and/or weighing less than 40 pounds must use a child safety seat that meet federal motor safety standards. Children that are less than eight years old that are under four feet nine inches in height must use booster seats. Additionally, infants and toddlers are recommended to use a rear-facing car seat, as long as possible, until they reach the highest weight or height allowed by the car safety seat manufacturer. Most of these car seats have limits that allow children to ride rear facing for two years of more as this is the safest position for an infant or toddler. Additionally, these car seats require extra room to place or remove the seat or the child.

Rear facing infant car seats are popular for their safety and portability. The entire cradle can be removed from the base that remains in the car. The cradle is then carried or attachable to a stroller for use out of the car. However, replacing infant car seats into a vehicle's back seat can be exceptionally difficult in a parking lot. Other motorists often park too close to vehicles, even when technically within a marked parking space, leaving the parent or guardian unable to place the child and/or the car seat back in the vehicle. Being unable to replace the infant and car seat can be frustrating and even dangerous. Caregivers are then left with no room to place the child and the car seat in the vehicle before backing out of the parking space. In addition, many non-disabled people have difficulty getting into their car seats without ample door space. These individuals may be older, less flexible, heavier, or have minor medical conditions that do not warrant a handicap placard.

Accordingly, there is a great need for an easy way for parents and caregivers to notify other motorists that ample parking space is required to place a child or infant carrier into backseat of a parked vehicle. The present invention effectively allows vehicle owners to park their vehicle without the worry that other vehicles will park too close leaving the parents or guardians unable to replace the child or car seat into the vehicle. The device is useable with any vehicle. When the vehicle is parked and the invention deployed, other drivers are notified of the need for additional space between vehicles. This allows other motorists an easy way to maintain a safe distance from the parked vehicle allowing parents or caregivers to easily replace their child and/or car seat back in the vehicle.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The subject matter disclosed and claimed herein, in one aspect thereof, comprises a signaling device for use with a vehicle. The signaling device comprises a vehicle attachment component. The vehicle attachment component is configured to engage a vehicle between the window and the vehicle window frame. The signaling device further comprises an extendable component. The extendable component is pivotally attached to one end of the vehicle attachment component. The extendable component is configured to rotate and extend outward away from the vehicle to define a space between vehicles. The signaling device further comprises a warning component attached to an end of the extendable component. The warning component comprises at least one visual indicator.

An additional embodiment of the present invention comprises a signaling device comprising a vehicle attachment component, an extendable component, and a warning component. The vehicle attachment component is configured to attach to and engage a vehicle between the window and the vehicle window frame via a slot in the vehicle attachment component. The extendable component is pivotally attached to one end of the vehicle attachment component.

The extendable component comprises a first arm and a second arm pivotally connected to the first arm. The first arm is a fixed length and rotates perpendicularly outward from the vehicle attachment component. The second arm rotates outward from the first arm. The second arm comprises a plurality of telescoping sections for extending outward from the vehicle to define a space between vehicles. The warning component comprises at least one visual indicator designating the purpose of the signaling device.

An additional embodiment of the present invention comprises a method of defining a space between parked vehicles using a signaling device. The method comprises the steps of installing the signaling device on a vehicle between a window and a window frame of the vehicle. Next, a first arm of an extendable component of the signaling device is rotated outward away from the vehicle. Then, a second arm of the extendable component pivotally attached to the first arm is rotated outward approximately 180 degrees. The second arm comprises a plurality of telescoping sections which are then extended further outward to define the final space between the vehicles. A warning component of the signaling device attached to a distal end of the second arm warns others of the defined space between the vehicles.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

BRIEF DESCRIPTION OF THE DRAWINGS

FIG. 1 illustrates a front perspective view of a signaling device for use with a vehicle in accordance with the disclosed architecture.

FIG. 2 illustrates a side perspective view of the signaling device for use with the vehicle in a retracted position in accordance with the disclosed architecture.

FIG. 7 illustrates an overhead perspective view of the signaling device for use with the vehicle in the fully extended position defining the space between parked vehicles in accordance with the disclosed architecture.

FIG. 8 illustrates a flowchart of a method for defining a space between parked vehicles using a signaling device in accordance with the disclosed architecture.

DETAILED DESCRIPTION OF THE INVENTION

Figure 3:
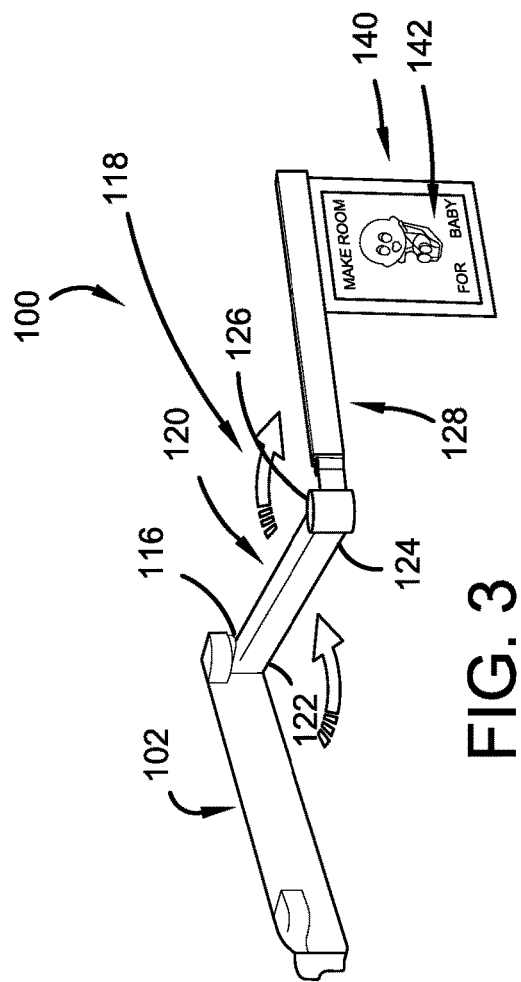
FIG. 3 illustrates a perspective view of the signaling device for use with the vehicle in a partially extended position in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

The present invention discloses a unique device for notifying other motorists that ample or additional parking space is required between vehicles. The device allows vehicle owners to park without the fear that another vehicle will park too close leaving insufficient room to reinstall a child or infant safety seat or to place a child or infant in the same. In use, the device attaches directly to the vehicle window and remains flush against the vehicle when the vehicle is in motion. A flag can extend outward form the vehicle once parked and may feature an illustration and text to notify other drivers of the need for the additional parking space. As such, the device offers a way for other drivers to maintain a sufficient distance when parking so that the parent can easily and safely package their child for transport.

The signaling device is an extendable courtesy flag for vehicles that functions as, among other things, an identifier for a child or infant in the back seat of a vehicle and/or that sufficient space is required to enable the child to enter or exit the vehicle. The device includes and extendable arm section with a decorative or informational flag. When installed, the arm remains flush against the vehicle firmly secured near the window. The arm can extend perpendicularly outward from the vehicle to display the flag. The flag may feature text and/or illustrations indicating the need for sufficient space for a child to enter or exit the vehicle and/or other information. Other motorists are able then to leave ample space between vehicles in parking spaces ensuring that a parent or guardian has convenient access to the back door and seat of the vehicle. Custom illustrations and text may be applied to the flag.

The present invention may be constructed using durable, weatherproof materials. The flag and arm may be available in various sizes to accommodate all user needs and preferences. Other flag designs may be offered for drivers needing ample parking space for non-permanent or lesser medical conditions not constituting a disability, such as broken limbs, back pain, obesity, neurological conditions, or the like.

Figure 5:
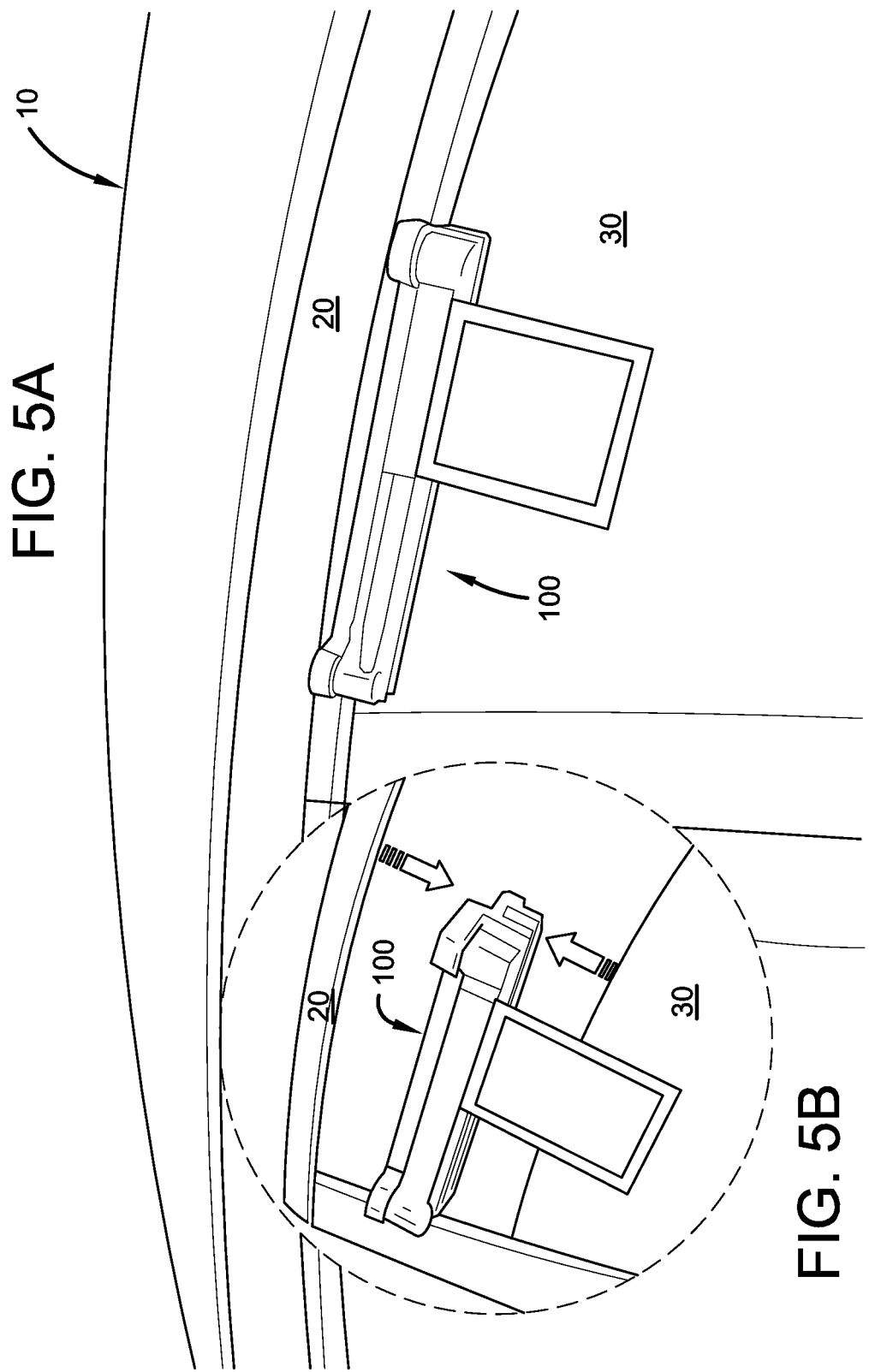
FIG. 5A illustrates a perspective view of the signaling device for use with the vehicle in the retracted position attached to a vehicle window in accordance with the disclosed architecture.
FIG. 5B illustrates a cut away perspective view of the signaling device for use with the vehicle in the retracted position being installed on the vehicle window in accordance with the disclosed architecture.

Referring initially to FIGS. 1 and 2, a signaling device 100 for use with a vehicle 10 comprises a vehicle attachment component 102. As illustrated in FIGS. 5A and 5B, the vehicle 10 comprises a window 30 and a window frame 20 for engaging the vehicle attachment component 102. The signaling device 100 is typically manufactured from a weather resistant plastic material, or other weather resistant material such as painted or treated metal, wood, etc. The signaling device 100 is dimensioned to fit a wide variety of car windows.

Returning to FIGS. 1 and 2, the vehicle attachment component 102 comprises a top 104 and a bottom 106. The bottom 106 comprises a slot 108 running between and transecting a first end 112 and a second end 114 of the vehicle attachment component 102. The slot 108 is dimensioned to fit over a top of the vehicle window 30. The slot may comprise a window engaging element 110, such as a weather resistant liner (e.g., rubber) for engaging the window 30 via friction and for ensuring a watertight seal when the window 30 is closed against the window frame 20 with the vehicle attachment component 102 installed as illustrated in FIG. 5A. To install the signaling device 100, the window 30 is partially rolled down and the vehicle attachment component 102 is positioned so that the slot 108 will engage the window 30 as illustrated in FIG. 5B. Then the window 30 is then rolled up so that the top 104 of the vehicle attachment component 102 rests against the window frame 20 while the slot 108 engages the window 30.

As illustrated in FIGS. 1-4, the signaling device 100 further comprises an extendable component 118. The extendable component 118 is pivotally connected to the vehicle attachment component 102, so that the extendable component 118 can rotate horizontally away from the vehicle at least 90 degrees. The extendable component 118 is at least partially telescoping in configuration as discussed infra. The vehicle attachment component 102 comprises a swivel connector 116 located at the second end 114 of the vehicle attachment component 102. The extendable component 118 comprises a first arm 120 and a second arm 128.

The first arm 120 of the extendable component 118 is a fixed length and is no longer than a length of the vehicle attachment component 102. The first arm 120 comprises a proximal end 122 and a distal end 124. The proximal end 122 of the first arm 120 is pivotally attached to the second end 114 of the vehicle attachment component 102 via the swivel connector 116. When the signaling device 100 is deployed, the first arm 120 rotates perpendicularly outward away from the vehicle attachment component 102 approximately 90 degrees.

The second arm 128 is pivotally connected to the first arm 120. The second arm comprises a plurality of telescoping sections 130. The first arm 124 further comprises a second swivel connector 126 located at the distal end of the first arm 120 for rotatably connecting the second arm 128 to the first arm 120. When deployed, the second arm 128 rotates outward approximately 180 degrees from the first arm 120, thereby extending the overall length of the extendable component 118.

Figure 4:
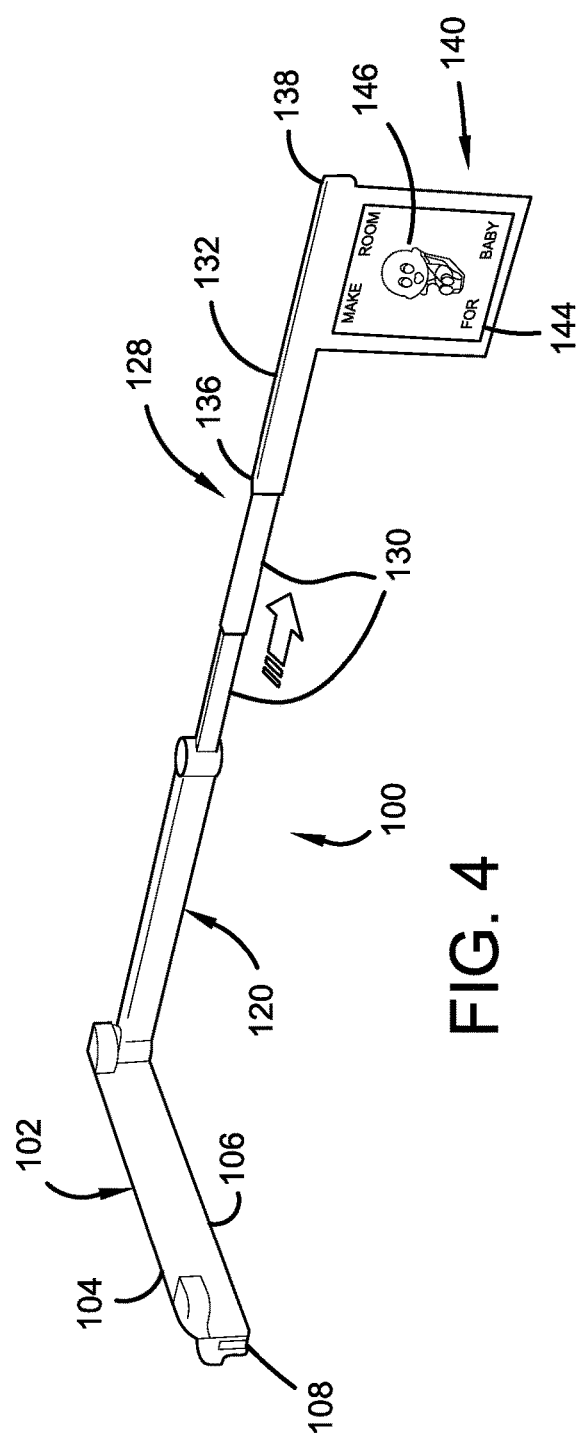
FIG. 4 illustrates perspective view of the signaling device for use with the vehicle in a fully extended position in accordance with the disclosed architecture.

The plurality of telescoping sections 130 are extendable from a nested position or un-retracted position, as illustrated in FIG. 2, to further extend the overall length of the extendable component 118 when un-nested, as illustrated in FIG. 4. The plurality of telescoping sections 130 are typically hollow in construction so as to nest within each other. The plurality of telescoping sections 130 comprise a last of the telescoping sections 132. The last of the telescoping sections 132 comprises a proximal end 136 and a distal end 138. The last of the telescoping sections 132 is the largest of the plurality of telescoping sections 130 in diameter or width so as to be able to receive the rest of the plurality of telescoping sections 130 when nested within.

Figure 6:
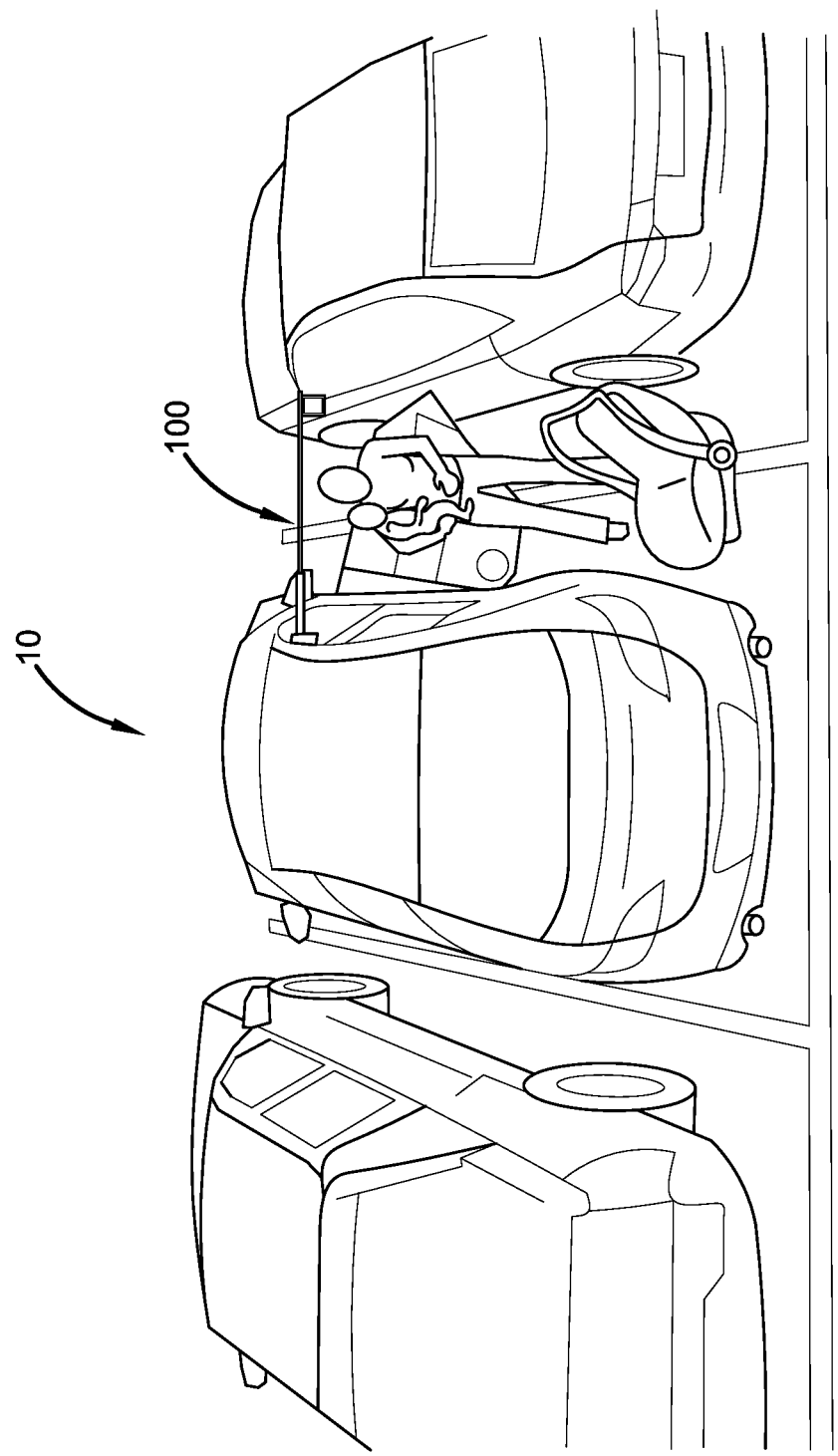
FIG. 6 illustrates a side view of the signaling device for use with the vehicle in the fully extended position defining a space between parked vehicles in accordance with the disclosed architecture.

The signaling device 100 further comprises a warning component 140. The warning component 140 is attached to the extendable component 118 along the distal end 138 of the last of the telescoping sections 132. The warning device 140 is typically a flexible or rigid flag. The warning device 140 comprises at least one visual indicator 142. The at least one visual indicator 142 may comprise text or words 144, a pictorial image 146, or a reflective component 148, such as a reflective sticker. As illustrated in FIGS. 6 and 7, the extended signaling device 100 thus defines a space between parked vehicles illustrating how much space is needed by a user to access the vehicle 10.

In an additional embodiment of the present invention, a method 200 of defining a space between parked vehicles using a signaling device 100 is disclosed in FIGS. 6-8. The method 200 begins by installing the signaling device 100 between a window 30 and a window frame 20 of a vehicle 10 at 210 as described supra. The signaling device 100 comprises a vehicle attachment component 102, an extendable component 118, and a warning component 140. The extendable component 118 comprises a first arm 120 and a second arm 128.

At 220, the first arm 120 of the extendable component 118 is rotated away from the vehicle attachment component 102 approximately 90 degrees outward away from the vehicle 10 along a swivel connector 116. At 230, the second arm 128 of the extendable component 118 is rotated outward from the first arm 120 approximately 120 degrees via a second swivel connector 126. Then, a plurality of telescoping sections 130 of the second arm 128 are un-nested and extended further outward away from the vehicle 10 to define the space between the vehicles at 240. The warning component 140 comprises at least one visual indicator 142 configured to alert a second vehicle not to park too close to the first vehicle when the signaling assembly 100 is deployed in a fully extended position as illustrated in FIGS. 6 and 7.

When the user has replaced a car seat or child back in the vehicle 10 and is ready to depart the parking area, the method 200 continues by retracting the plurality of telescoping sections 130 of the second arm 128 into a nested position at 250. Then at 260, the retracted second arm 128 is rotated inward approximately 180 degrees back against the first arm 120. At 270, the first arm 120 is rotated inward approximately 90 degrees back against the vehicle attachment component 102. Finally, the signaling device 100 is either uninstalled from the window 30 at 280 or left in place on the window 30 in an undeployed configuration as in FIG. 1, and the method ends at 290.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A signaling device for use with a vehicle, the signaling device comprising:
   a vehicle attachment component comprising a bottom slot running between and transecting a first and second ends of the vehicle attachment component and a window engaging element positional within and lining the bottom slot for frictionally engaging a window of the vehicle;
   an extendable component pivotally connected to the vehicle attachment component,
   the extendable component comprising a first arm connected to the second end of the vehicle attachment component rotatable approximately 90 degrees horizontally outward away from the window and a second arm pivotally connected to the first arm, the second arm rotatable outward approximately 180 degrees from the first arm and comprising a plurality of telescoping sections comprising more than one nesting sections and a distal section that is larger in diameter or width than the more than one nesting sections, wherein the more than one nesting sections are proximal to the distal section when the second arm is extended and nest within the distal section when retracted; and
   a warning component attached to the second arm of the extendable component.

2. The signaling device of claim 1, wherein the vehicle attachment component comprises a swivel connector for connecting the vehicle component to the first arm.

3. The signaling device of claim 1, wherein the first arm is a fixed length.

4. The signaling device of claim 1, wherein the first arm and the second arm are pivotally connected via a second swivel connector.

5. The signaling device of claim 1, wherein the warning component comprises at least one visual indicator.

6. The signaling device of claim 5, wherein the at least one visual indicator is pictorial.

7. The signaling device of claim 5, wherein the at least one visual indicator is reflective.

8. A method of defining a space between parked vehicles comprising the steps of:
- installing a signaling device between a window and a window frame of a vehicle where a weather resistant element lining a bottom slot of a vehicle window attachment component of the signaling device frictionally engages a window of the vehicle to providing a watertight seal;
- rotating a first arm of an extendable component of the signaling device approximately 90 degrees horizontally outward away from the window;
- rotating a second arm of the extendable component approximately 180 degrees horizontally from the first arm; and
- telescoping the second arm outward exposing more than one nesting sections housed within a distal section of the second arm.

9. The method of claim 8, wherein the signaling device further comprises a warning component configured to alert a second vehicle not to park too close to the vehicle when the signaling assembly is deployed.

\* \* \* \* \*